United States Patent [19]

Horiuchi et al.

[11] Patent Number: 4,963,514

[45] Date of Patent: Oct. 16, 1990

[54] CERAMIC MULLITE-SILICA GLASS COMPOSITE

[75] Inventors: Michio Horiuchi, Koshoku; Tsuyoshi Machii, Suzaka, both of Japan

[73] Assignee: Shinko Electric Industries Co., Ltd., Nagano, Japan

[21] Appl. No.: 317,636

[22] Filed: Mar. 1, 1989

[30] Foreign Application Priority Data

Mar. 2, 1988 [JP] Japan .................................. 63-49315

[51] Int. Cl.⁵ ............................................. C04B 35/18
[52] U.S. Cl. ...................................... 501/32; 501/128; 501/133; 501/153; 501/154
[58] Field of Search ............... 501/128, 133, 153, 154, 501/32

[56] References Cited

U.S. PATENT DOCUMENTS

| | | | |
|---|---|---|---|
| 4,559,270 | 12/1985 | Sara ....................................... | 501/128 |
| 4,736,276 | 4/1988 | Ushifusa et al. ..................... | 501/128 |
| 4,817,276 | 4/1989 | Toda et al. ........................... | 501/128 |

FOREIGN PATENT DOCUMENTS

| | | | |
|---|---|---|---|
| 0172382 | 2/1986 | European Pat. Off. ............ | 501/153 |
| 54-026565 | 9/1979 | Japan ................................... | 501/128 |
| 61-036168 | 2/1986 | Japan ................................... | 501/128 |
| 0381647 | 5/1973 | U.S.S.R. .............................. | 501/128 |

*Primary Examiner*—Mark L. Bell
*Assistant Examiner*—Anthony J. Green
*Attorney, Agent, or Firm*—Michael N. Meller

[57] ABSTRACT

A ceramic composition, comprises a fired product of a starting material mixture containing 10% by weight to 70% by weight of silicon dioxide powder added to mullite powder fired at 1500° C. to 1650° C.

5 Claims, 3 Drawing Sheets a) SILICON DIOXIDE POWDER b) MULLITE STARTING MATERIAL POWDER c) SINTERED BODY
   (MULLITE, $Y_2O_3$ 2% BY WEIGHT)

d) SINTERED BODY
   (MULLITE, $Y_2O_3$ 40% BY WEIGHT SILICON DIOXIDE)

40% BY WEIGHT SiO₂-MULLITE CERAMIC
(RELATIVE DENSITY > 98%)

MULLITE CERAMIC
(RELATIVE DENSITY > 97%)

CERAMIC MULLITE-SILICA GLASS COMPOSITE

BACKGROUND OF THE INVENTION

1. Field of the Invention

The present invention relates to a ceramic composition, and more particularly, to a ceramic composition which can be used as the material for electronic parts.

2. Description of the Related Art

The demands for an increased signal propagation speed, high density, and lower cost of electronic parts, have brought the following essential requirements for the package and the substrate material constituting the electronic parts:

(1) a low dielectric constant; (2) characteristics such as a thermal expansion coefficient matching that of a semiconductor device (low thermal expansion ratio); (3) a high mechanical strength; (4) a high thermal conductivity; and (5) a low cost. In addition, the reliability as an electronic part, such as hermeticity, is also essential.

In response to these requirements, ceramics such as aluminum nitride ceramic, silicon carbide ceramic, low temperature fired ceramic, mullite ceramic, have been developed.

Among these ceramics, mullite ceramic has a lower dielectric constant and lower thermal expansion ratio than those of the alumina ceramic used in the prior art, but has substantially the same material cost. Another ceramic having a low dielectric constant and low thermal expansion ratio is a low temperature fired ceramic, but this has higher material cost and lower strength than the above mullite. Also, although a lower electric resistivity material (gold, silver, etc.) can be used as the metallizing material, compared with the tungsten or molybdenum employed for an alumina ceramic or mullite ceramic, the problem of cost or technique arises. Further, the soldering material is limited for a low temperature fired ceramic.

In contrast mullite ceramic has the advantages that the metallizing or soldering of external leads, and the formation of a resistor by post-firing can be carried out with a high reliability by using the methods applied to a conventional alumina ceramic; that in the constitution of a package, when a metal plate of molybdenum or a metallized high thermal conductivity ceramic is soldered as the heat dissipating portion, both the material and the method which have been conventionally used for alumina ceramic are applicable; and that, different from the case of alumina ceramic, the mullite ceramic guaranties a reliable bonding strength between the ceramic and the heat dissipating plate as well as between the ceramic and the semiconductor device.

Accordingly, mullite ceramic is most suitable for meeting the requirements for a package and substrate material for electronic parts, but has the following disadvantages in coping with recent demands for a higher speed and higher density of the electronic parts.

(1) When mounting a bare chip or flip chip to increase the density, the mullite ceramic of the prior art has an inadequately small thermal expansion coefficient.

(2) To obtain a higher signal propagation speed, the dielectric constant of mullite ceramic of the prior art, i.e., 7.0 or higher, is not sufficiently low. Namely, a value of lower than 7.0 is required as the dielectric constant for the above purpose.

A mullite ceramic with a low dielectric constant, for example, can be obtained by lowering the density of the sintered product, but in this case, other characteristics such as the mechanical strength will be undesirably lowered. Also, as the flexural strength of a mullite ceramic, a value of more than 3000 kg/cm$^2$ has been obtained by using a very pure and fine starting material powder, but these sintered products, due to minute amounts of liquid phase formed during the firing can form a conductor by the co-firing of conductor materials such as tungsten and molybdenum, whereby the adhesive strength of the metallized layer obtained by firing is too low for practical application. The adhesive strength of the metallized layer can be improved by adding, for example, a group IIa element compound such as MgO to the starting material powder of mullite, but in this case a problem arises in that the flexural strength of the sintered product is very low.

SUMMARY OF THE INVENTION

Therefore, an object of the present invention is to provide a ceramic compound substrate material, particularly for electronic parts, e.g., a package, having very high properties.

According to the present invention, there is provided a ceramic composition, comprising a fired product of a starting material mixture containing 10% by weight to 70% by weight of silicon dioxide powder added to mullite powder fired at 1500° C. to 1650° C.

DESCRIPTION OF THE PREFERRED EMBODIMENTS

Figure 1:
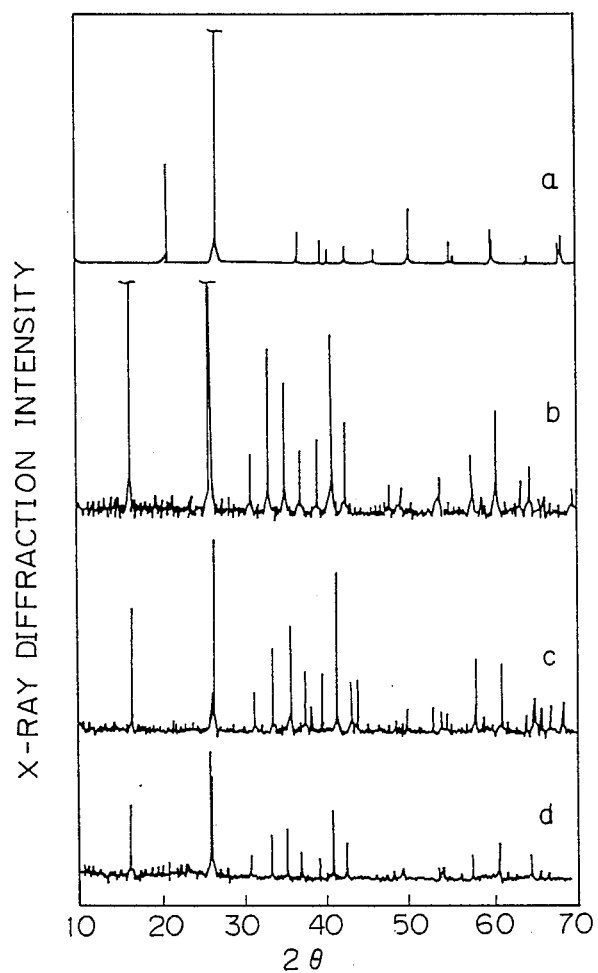
FIG. 1 shows X-ray diffraction patterns of the ceramic composition according to the present invention and the starting material powders used for the ceramic composition.

The preferred embodiments of the present invention will now be described.

The ceramic composition according to the present invention is a fired product of a starting material mixture containing 10% by weight to 70% by weight of silicon dioxide (SiO$_2$) powder added to mullite powder at 1500° C. to 1650° C. When the amount of silicon dioxide powder is less than 10% by weight an adequate modification of the characteristics cannot be achieved, and when the amount of silicon dioxide powder is more than 70% by weight the composite body may be deformed during sintering at a temperature of 1500° C. to 1650° C. is required to obtain a dense or sintered body. When a simultaneously fired metallized layer is formed by using tungsten paste, preferably the firing is carried out in neutral or reducing atmosphere at a firing temperature of 1550° C. to 1600° C.

When 40% or less of silicon dioxide is added to obtain a dense sintered product, at least one of the group IIa element compounds or the group IIIa element compounds must be added as the sintering aid to the starting material powder. The amount of the group IIa element compound or the group IIIa element compound is preferably 0.1% to 5% by weight for the weight of the mullite in the starting material mixture. The total amount added may be smaller when two or more kinds are simultaneously added than when only one kind is added, when the amount of the group IIa or IIIa element compound is less than 0.1% by weight sufficient densification will not be achieved, and when the amount thereof is more than 5% by weight the flexural strength tends to decrease and the dielectric constant will increase. The amount of the sintering aid added to promote densification of the sintered product may be slightly varied depending on the particle size distribution of the starting material powder or the firing temperature.

When the thus obtained sintered body is applied as an insulating substrate material, the flatness of the substrate must be improved. Therefore, after completing the firing, a flattening process for removing warping and strain is carried out by loading a substrate with a flat jig at a temperature lower than that of the firing process. When the flattening process is carried out, flecks or spots are often generated in the substrate including at least one of the group IIa element compounds and the group IIIa element compounds of the periodic table depending on the added amount, the mullite/silicon dioxide ratio or the temperature used during the flattening process. Although these flecks or spots generated in the substrate do not affect the electrical properties such as insulating resistance, dielectric constant, and dielectric loss, and mechanical properties such as flexural strength such flecks or spots lower the commercial value of the article. To prevent this phenomena, the addition of 2% or less by weight of the group Va element oxide to the mullite powder in the starting material mixture is carried out. Namely, when a suitable amount of the group Va element compound is contained in the starting material mixture, even if the flattening process is effected after the firing process, no flecks or spots are generated.

FIG. 1 shows X-ray diffraction patterns of the ceramic compositions according to the present invention, in which a is silicon dioxide powder, b is mullite starting material powder, c is a sintered product having 2% by weight of $Y_2O_3$ added as the sintering aid in the mullite starting material powder, and d is a sintered product having 40% by weight of silicon dioxide powder added in the mullite starting material powder in which the sintering aid $Y_2O_3$ was added. According to the X-ray diffraction patterns, in both the sintered products c and d, only the diffraction peak of the mullite single phase can be recognized. This suggests that, although the silicon dioxide added as the starting material powder is crystalline, it is amorphous in the sintered product.

Figure 2:
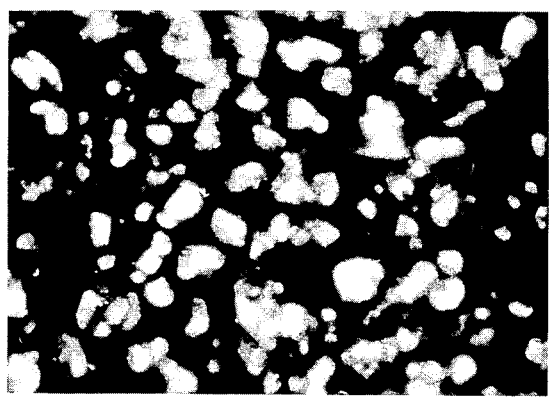
FIG. 2 is an electron microscope photograph representing the grain structure of the sintered product surface of the ceramic composition of the present invention.
Figure 3:
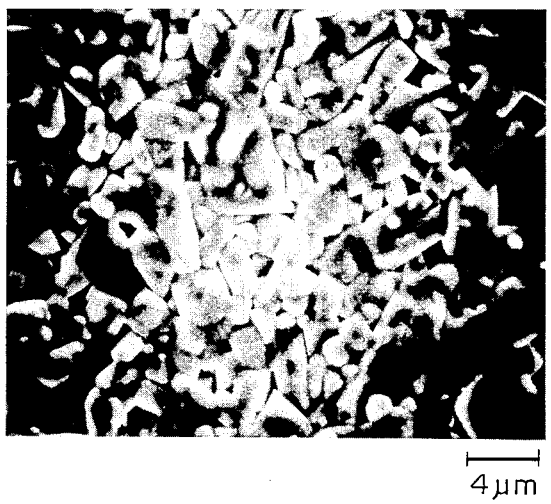
FIG. 3 is an electron microscope photograph representing the grain structure of the sintered product surface of the mullite ceramic of the prior art; and, FIG. 4 is a graph showing the thermal expansions of the ceramic compositions according to the present invention (MS1 and MS2) and 92% by weight alumina ceramic, the mullite ceramic of the prior art, and silicon.

FIG. 2 shows an electron microscope photograph (SEM image) of the sintered product surface having 40% by weight of silicon dioxide added therein. According to this Figure, the mullite crystal particles are dispersed in the glassy phase of the obtained sintered product which is quite different from the convential mullite ceramic (FIG. 3), the mullite crystal particles are sintered as dispersed in the glass phase. A sintered product similar to this can be also obtained by calcination and firing of a mullite precursor (amorphous) comprising an alumina/silicon dioxide mixture with an enlarged compositional ratio of silicon dioxide obtained by the sol-gel method, for example. These compositions, however, have generally low optimum temperature ranges for densification and are not suitable for the formation of a metallized layer by simultaneous firing with a conductor material such as tungsten, and further, have a lower flexural strength, thus having different properties from the ceramic composition of the present invention.

As the starting material powder in the present invention any mullite powder (i.e., produced by an electrofusing process, a firing process or a chemical synthetic process such as the sol-gel method or others) can be used. To obtain various characteristics such as mechanical strength and green sheet moldability, a good mullite powder having as high a purity as possible is preferred, and preferably having an average particle size of from 0.6 $\mu$m to 4 $\mu$m.

As silicon dioxide powder which is used as the starting material a reagent powder obtained by a pulverization of pure siliceous stone and electrofused silica can be used. Note, an electrofused silica, which is amorphous, may cause cracks to form, depending on the amount added or the firing conditions, and form a very brittle sintered product. Also, the formation of crystobalite phase may occur.

The average particle size of the silicon dioxide powder is preferably about 1 $\mu$m to 50 $\mu$m, in view of the castability and sintering behavior of the green sheet. During the casting of the green sheet, although also depending on the viscosity of the slurry, the mullite powder and the silicon dioxide powder may be distributed separately in the thickness direction of the green sheet due to a difference in their specific gravities, which tends to cause warping of the sintered product, and therefore, to prevent the separation of the components the particle size of silicon dioxide is preferably slightly larger than that of the mullite starting material powder but not more than 5-fold.

To promote the sinterability of the starting material mixture, one or two or more of the group IIa element compounds or the group IIIa element compounds may be added at the same time. The amount added, which depends on the mullite/silicon dioxide ratio, the particle size distributions of the respective starting material components, and the kinds of the compounds added, is generally 5% or less by weight based on the weight of the mullite in the starting material mixture.

To obtain a dense and uniform sintered product the necessary and sufficient amounts added of these group IIa element compounds or the group IIIa element compounds added vary depending on the mullite/silicon dioxide ratio. Namely, when the amount of silicon dioxide added is smaller, a large amount of the group IIa element compounds or the group IIIa compounds must be added, and conversely, if the amount of silicon dioxide added is larger, a smaller amount of the group IIa element compounds or the group IIIa element compounds must be added.

Although depending also on the particle size distribution of the starting material powder, when the silicon dioxide content is more than 60% by weight, the sintered product can be sufficiently densified at a temperature of from 1500° C. to 1650° C., even if a group IIa element compound or group IIIa element compound is not added.

When the amount of silicon dioxide added is more than 70% by weight, an excessive liquid phase will be formed during firing at a temperature of from 1500° C. to 1700° C., and a metallized layer may be formed by a simultaneous firing of a conductor material, whereby the sintered product will be deformed or firmly adhered to a setter for firing.

To observe the difference in action depending on the kind of the group IIa element compound or the group IIIa element compound to be used as the sintering aid, among the group IIa element compounds, MgO, Mg(OH)$_2$, and MgCO$_3$ have the greatest densification effect at a minimum amount, but 1.5-fold more in amount had to added when using CaCO$_3$ and BaCO$_3$, to obtain the same density as when MgO was added.

Among the group IIIa element compounds, Y$_2$O$_3$ and CeO$_2$ have greater effects at a small amount, similar to MgO, while La$_2$(CO$_3$)$_3$ or La$_2$CO$_3$ has a smaller effect, so that they must be added in the comparison of a larger amount compared with CaCO$_3$, but no difference was seen in the densification effect of Y$_2$O$_3$ and YF$_3$.

As the group Va element oxides added to prevent flecks or spots generated during the flattening process, V$_2$O$_5$ Nb$_2$O$_5$, and Ta$_2$O$_5$ are preferable. Among the above, Nb$_2$O$_5$ is the oxide most effectively preventing the generation of the flecks, in that even the addition of only about 0.5% by weight to the mullite powder contained in the starting material mixture had a sufficient preventive effect.

On the other hand, although the addition of V$_2$O$_5$ prevented the generation of flecks or spots a tendency to color the entire sintered body was recognized. Further, the addition of Ta$_2$O$_5$ had the required effect but the larger amount than that of Nb$_2$O$_5$ should be added.

The ceramic composition of the present invention thus obtained has a excellent thermal expansion coefficient of 2.3 to $4.3 \times 10^{-6}$/° C., a dielectric constant of 4.8 to 6.9 (1 MHz), and a flexural strength of 1800 kg/cm$^2$ to 3100 kg/cm$^2$, close to the flexural strength of 92% by weight alumina ceramic frequently used in the prior art as the material for electronic parts.

The flexural strength of the ceramic composition of the present invention also may depend on the particle size distributions of the mullite powder and the silicon dioxide powder and the compositional ratio of the respective powders, and is about 3000 kg/cm$^2$ at a compositional ratio of mullite of 70% by weight to 80% by weight, which is about 1.5-fold of the value (2000 kg/cm$^2$) obtained for the single substance of mullite. Therefore, the reason why the ceramic composition of the present invention has a great flexural strength may be due to the increased flexural strength obtained by either one or both of the actions of the crack diffraction mechanism by the dispersed mullite particles and the prestress mechanism due to a difference in the thermal expansion coefficient of the mullite particles and the quartz glass formed during firing.

More specifically, then the silicon dioxide powder used as the starting material is a pulverized product of pure siliceous stone, it is recognized to be crystalline by X-ray diffraction, and the thermal expansion ratio thereof is as high as about $14 \times 10^6$/° C. (c-axis direction). Nevertheless, as mentioned above, since silicon dioxide is amorphous in the ceramic composition of the present invention, the thermal expansion coefficient thereof is considered to be about $0.5 \times 10^{-6}$/° C., whereby prestress is considered to act near the surface of the mullite particle through the difference of the thermal expansion coefficient of the mullite particles of about $4.5 \times 10^{-6}$/° C.

The occurrence of crack diffraction can also be realized during breaking of the sintered product of the present invention when the microstructure of the broken surface of the sintered product of the present invention is observed to have a remarkable unevenness compared with the broken surface of the mullite single substance, but it is observed that a drawing toughening mechanism accompanying the conversion of the mullite particles to needles, as known in porcelains, etc. containing the mullite phase, has participated therein.

This increased mechanical strength, which may also depend on the preparation method, is a specific feature of the sintered product of the present invention, and can meet the demand for a material for electronic parts.

The present invention is described in detail below with reference to Examples.

EXAMPLE 1

To 66.7 parts by weight of electro-fused mullite powder with an average particle size of about 2 μm were added 31.3 parts by weight of silicon dioxide powder with an average particle size of about 10 μm, and 2.0 parts by weight of Y$_2$O$_3$ powder with an average particle size of about 1 μm were further added followed by ball mill mixing for 24 hrs. using a n-butanol toluene mixture as the dispersing medium.

Then, 4 parts by weight of di-n-butyl phthalate and 8 parts by weight of a polyvinyl butyral were added, followed by ball mill mixing for a further 24 hours.

The resultant mixture was defoamed under vacuum and formed into a sheet by the doctor blade method. The green sheet obtained had a density of 1.79 g/cm$^3$.

The sheet was then fired in a weak reducing atmosphere of 1570° C. for 2 hours to obtain a sintered product having a density of 2.77 g/cm$^3$.

EXAMPLE 2

To 66.7 parts by weight of electro-fused mullite powder with an average particle size of about 2 μm were added 33.3 parts by weight of silicon dioxide powder with an average particle size of 10 μm, and a green sheet was prepared by the same procedure as in Example 1. The green sheet was divided into two portions, and in a weak reducing atmosphere, one portion was fired at 1570° C. and the other portion was fired at 1610° C., for 2 hours.

The sintered product obtained by firing at 1570° C. had a density of 2.39 g/cm$^3$, and that obtained by firing at 1610° C. had a density of 2.75 g/cm$^3$.

EXAMPLE 3

To 66.7 parts by weight of electro-fused mullite powder with an average particle size of about 2 μm were added 33.3 parts by weight of silicon dioxide powder with an average particle size of 10μ, followed by 1 part by weight of magnesium oxide, and a green sheet was prepared and fired by the same procedure as in Example 1.

The sintered product obtained had a density of 2.74 g/cm$^3$.

EXAMPLE 4

To 59 parts by weight of mullite powder with an average particle size of about 1 μm obtained by the sol-gel method were added 40 parts by weight of silicon dioxide powder with an average particle size of about 10 μm followed by 1 part by weight of yttrium oxide powder, and a green sheet was prepared and fired by the same procedure as in Example 1.

The sintered product had a density of 2.66 g/cm$^3$.

EXAMPLE 5

In Example 4, by using electro-fused silica powder with an average particle size of about 6 μm as the silicon dioxide powder, a sintered product having the same composition and under the same conditions as in Example 4 was obtained.

The sintered product obtained had a density of 2.63 g/cm$^3$.

In this Example, in a thick sample formed by laminating the green sheets, cracks were frequently observed in the sample during firing, and a transition of a part of the silicon dioxide to silica glass did not occur, and probably existed as crystobalite.

EXAMPLE 6

To 78.5 parts by weight of electro-fused mullite powder with an average particle size of about 2 μm were added 20 parts by weight of silicon dioxide powder with an average particle size of about 2 μm followed by 3 parts by weight of yttrium oxide, and a green sheet was prepared and fired by the same procedure as in Example 1.

The sintered product had a density of 2.78 g/cm$^3$.

EXAMPLE 7

To 69.4 parts by weight of mullite powder with an average particle size of about 8 μm obtained by the sol-gel method were added 28.6 parts by weight of silicon dioxide powder with an average particle size of about 10 μm followed by 2.5 parts by weight of yttrium oxide powder, and a green sheet was prepared and fired by the same procedure as in Example 1.

The sintered product had a density of 2.77 g/cm$^3$.

EXAMPLE 8

In Example 7, the amount of silicon dioxide was changed to 29.6 parts by weight and 1 part by weight of magnesium oxide was added instead of yttrium oxide, and a green sheet was prepared and fired by the same procedure as in Example 1.

The sintered product had a density of 2.59 g/cm$^3$.

EXAMPLE 9

To 40 parts by weight of electro-fused mullite powder with an average particle size of 2 μm were added 60 parts by weight of silicon dioxide powder with an average particle size of 2 μm, followed by 0.2 parts by weight of yttrium oxide, and a green sheet was prepared and fired by the same procedure as in Example 1.

The sintered product obtained had a density of 2.50 g/cm$^3$.

EXAMPLE 10

To 38.4 parts by weight of electro-fused mullite powder with an average particle size of 2 μm were added 60 parts by weight of silicon dioxide powder with an average particle size of 10 μm followed by 1.6 parts by weight of yttrium fluoride and 0.4 parts by weight of niobium oxide ($Nb_2O_5$), and a green sheet was prepared and fired in a weak reducing atmosphere of 1570° C. for 2 hours by the same procedure as in Example 1.

The sintered product had a density of 2.65 g/cm$^3$. Although the sintered product was maintained at a temperature of 1450° C. under a neutral gas atmosphere for 1 hour, the appearance of the sintered product was not changed. The flecks or the spots mentioned above were never generated.

EXAMPLE 11

By the same procedure as in example 10, except that the added amount of niobium oxide was 0.2 parts by weight, a sintered product was obtained.

The sintered product obtained had a density of 2.66 g/cm$^3$. Although the sintered product was heat treated at a temperature of 1450° C. as in the example 10, the appearance thereof was not changed.

EXAMPLE 12

By the same procedure as in example 10, except that 1 part by weight of vanadium oxide ($V_2O_5$) instead of niobium oxide was added, a sintered product was obtained. The density of the sintered product was almost the same as that when niobium oxide was added. The obtained product was heat treated at a temperature of 1450° C. as in Example 10, and the appearance of the sintered product was not changed. But however, as compared with a sintered body in which niobium oxide was added, it was slightly colored yellow.

EXAMPLE 13

By the same procedure as in example 10, except that 1 part by weight of tantalum oxide ($Ta_2O_5$) instead of niobium oxide was added, a sintered product was obtained. The density of the sintered product was almost the same as that when niobium oxide was added. The obtained product was heat treated at a temperature of 1450° C. as in Example 10, and the appearance of the sintered product was not changed. Note, a larger added amount of $Ta_2O_5$ was required, compared with that of riobium oxide.

COMPARATIVE EXAMPLE

By the same procedure as in example 10, except that the added amount of niobium oxide was zero (0), a sintered product was obtained. The density of the sintered product was 3.65 g/cm$^3$. The obtained product was heat treated at a temperature of 1450° C. as in Example 10, and consequently, many circular flecks and the like could be seen over the entire surface of the sintered product. The flecks were spot-shaped having a grayish color in a white sintered product surface, and were variously sized to a maximum diameter of 4 mm. When light was applied to the sintered product it was confirmed that only the fleck portions were translucent.

Table 1 shows the thermal expansion coefficients, dielectric constants, flexural strengths obtained by measuring the sintered products of the above Examples. As shown in the Table, the ceramic compositions of the present invention had a superior thermal expansion characteristic and dielectric characteristic, and a required mechanical strength.

Particularly, with respect to the thermal expansion coefficient, the product obtained had a specific feature in that the thermal expansion coefficient thereof was substantially identical to that of a silicon semiconductor device.

TABLE 1

| Example: | 1 | 4 | 6 | 9 |
|---|---|---|---|---|
| Amount of $SiO_2$ added (parts by weight) | 31.3 | 40.0 | 20.0 | 60.0 |
| Thermal expansion coefficient ($\times 10^{-6}$/°C.) | 3.75 | 3.40 | 3.98 | 2.70 |
| Dielectric constant (1 MHz) | 5.90 | 5.71 | 6.34 | 5.10 |
| Flexural strength | 3000 | 2200 | — | — |

TABLE 1-continued

| Example: | 1 | 4 | 6 | 9 |
|---|---|---|---|---|
| (kg/cm²) | | | | |

Figure 4:
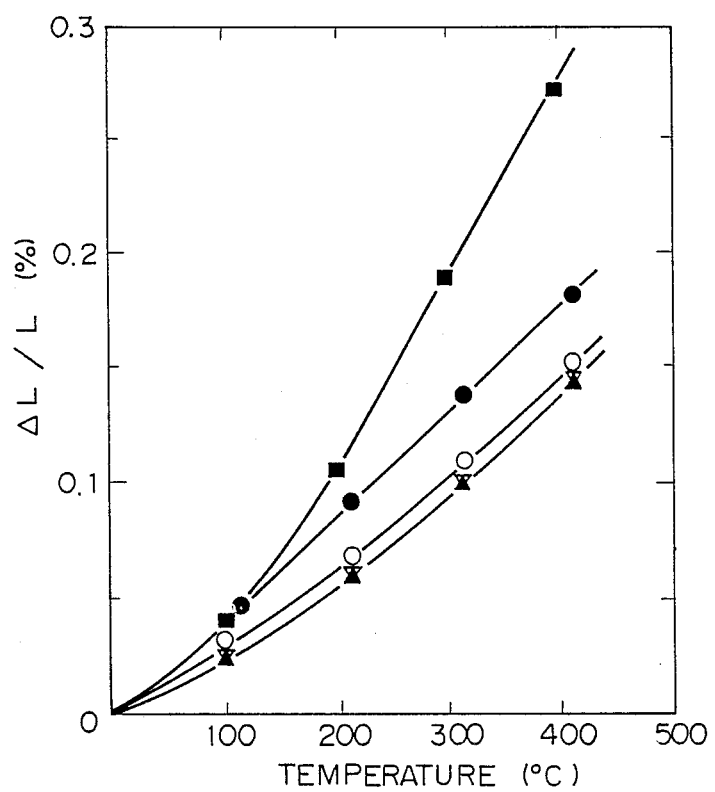

FIG. 4 is a graph showing the temperature change of the thermal expansion ratio of the ceramic composition according to the present invention, and for comparative purpose, the thermal expansion ratios of silicon, the ceramic composition obtained in Example 1 (MS1), the ceramic composition obtained in Example 4 (MS2), the mullite ceramic of the prior art, and the 92% by weight alumina ceramic of the prior art. As can be seen from the graph, the ceramic of Example 1 exhibits a value very close to the thermal expansion ratio of silicon, and that of the ceramic of Example 4 is substantially identical to the thermal expansion ratio of silicon. This characteristic cannot be obtained as the thermal expansion ratio of the mullite ceramic of the prior art.

Note, the present invention is not limited to the above Examples, and many modifications can be made within a scope not departing from the spirit of the present invention.

The ceramic composition of the present invention has a superior thermal expansion characteristic and dielectric characteristic to the ceramics of the prior art, and has a required flexural strength.

Also, by making the compositional ratio of silicon dioxide in the starting material mixture 30% to 50% by weight, the composition can be preferably used as the package and the substrate material for electronic parts.

Further, by adding a group IIa element compound or a group IIIa element compound as the sintering aid, densification of the sintered product can be promoted, and the optimum firing temperature can be varied. Moreover, firing is possible under the same conditions by using a furnace used for the firing of the alumina ceramic usually used as the material for electronic parts in the prior art, and therefore, remarkable effects such as a great economical advantage can be exhibited. Further, by adding a small amount of the group Va element oxide, the generation of flecks or spots in a flattening process for the substrate can be efficiently prevented.

What is claimed is:

1. A mullite-silica glass composite ceramic consisting essentially of the product formed by firing at a temperature of 1500° to 1650° C. a starting material mixture consisting essentially of mullite powder, 10–70% by weight of silicon dioxide powder and 0.1–5% by weight, based on the mullite powder, of a group IIIA element compound.

2. A mullite-silica glass composite ceramic according to claim 1, wherein 30% by weight to 50% by weight of silicon dioxide powder is added to mullite powder.

3. A mullite-silica glass composite ceramic according to claim 1, wherein said group IIIa element compound is selected from the group consisting of $Y_2O_3$, $CeO_2$, $La_2(CO_3)_3$, $La_2O_3$, and $YF_3$ and mixtures thereof.

4. A mullite-silica glass composite ceramic according to claim 1, wherein a group Va element oxide in the amount of 0.05 to 2.0% by weight is further added to the mixture.

5. A mullite-silica composite ceramic according to claim 4, wherein said group Va element oxide is selected from the group consisting of $Nb_2O_5$, $V_2O_5$ and $Ta_2O_5$.

* * * * *

UNITED STATES PATENT AND TRADEMARK OFFICE
CERTIFICATE OF CORRECTION

PATENT NO. : 4,963,514

DATED : October 16, 1990

INVENTOR(S) : Horiuchi et al.

It is certified that error appears in the above-identified patent and that said Letters Patent is hereby corrected as shown below:

```
    Title page, left column;
    Amend Foreign Application Priority Data to read:
-- (30) Foreign Application Priority Data
        March 2, 1988(JP) Japan----------------63-49315
        January 31, 1989(JP) Japan-------------1-23354 --
```

Signed and Sealed this

Thirtieth Day of May, 1995

*Attest:*

BRUCE LEHMAN

*Attesting Officer*     *Commissioner of Patents and Trademarks*